US007395380B2

(12) United States Patent
Dieffenderfer et al.

(10) Patent No.: US 7,395,380 B2
(45) Date of Patent: *Jul. 1, 2008

(54) SELECTIVE SNOOPING BY SNOOP MASTERS TO LOCATE UPDATED DATA

(75) Inventors: James N. Dieffenderfer, Apex, NC (US); Bernard C. Drerup, Austin, TX (US); Jaya P. Ganasan, Youngsville, NC (US); Richard G. Hofmann, Apex, NC (US); Thomas A. Sartorius, Raleigh, NC (US); Thomas P. Speier, Holly Springs, NC (US); Barry J. Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 10/393,116

(22) Filed: Mar. 20, 2003

(65) Prior Publication Data
US 2004/0186963 A1     Sep. 23, 2004

(51) Int. Cl.
*G06F 12/00* (2006.01)
*G06F 3/00* (2006.01)
(52) U.S. Cl. ............ 711/146; 711/118; 711/189; 711/123; 711/141; 711/144; 711/145; 711/210; 711/2; 711/3; 710/3; 710/4
(58) Field of Classification Search ............ 711/2, 711/3, 146, 118, 123, 141, 210; 710/3, 4
See application file for complete search history.

(56) References Cited

U.S. PATENT DOCUMENTS 5,404,489 A * 4/1995 Woods et al. .......... 711/152

5,659,710 A   8/1997 Sherman et al. .......... 395/473

(Continued)

OTHER PUBLICATIONS

Bilir et al. (Muticast Snooping: A new Coherence Method Using a Multicast Address Network; Computer Architecture, 1999. IEEE, Proceedings of the 26th International Symposium on May 2-4, 1999 pp. 294-304).*

(Continued)

*Primary Examiner*—Kevin L. Ellis
*Assistant Examiner*—Mardochee Chery
(74) *Attorney, Agent, or Firm*—Joscelyn G. Cockburn; James A. Lucas; Driggs, Hogg & Fry Co., LPA

(57) ABSTRACT

A method and structure for snooping cache memories of several snooping masters connected to a bus macro, wherein each non-originating snooping master has cache memory, and wherein some, but less than all the cache memories, may have the data requested by an originating snooping master and wherein the needed data in a non-originating snooping master is marked as updated, and wherein a main memory having addresses for all data is connected to the bus macro.

Only those non-originating snooping masters which may have the requested data are queried. All the non-originating snooping masters that have been queried reply. If a non-originating snooping master has the requested data marked as updated, that non-originating snooping master returns the updated data to the originating snooping master and possibly to the main memory. If none of the non-originating snooping masters has the requested data marked as updated, then the requested data is read from main memory.

8 Claims, 2 Drawing Sheets

U.S. PATENT DOCUMENTS

| | | | |
|---|---|---|---|
| 5,878,268 A | 3/1999 | Hagersten | 395/800.28 |
| 5,890,217 A | 3/1999 | Kabemoto et al. | 711/141 |
| 6,023,747 A | 2/2000 | Dodson | 711/141 |
| 6,065,077 A * | 5/2000 | Fu | 710/100 |
| 6,336,169 B1 | 1/2002 | Arimilli et al. | 711/144 |
| 6,467,012 B1 | 10/2002 | Alvarez et al. | 710/316 |

OTHER PUBLICATIONS

"Measuring Memory Hierarchy Performance of Cache-Coherent Multiprocessors Using Micro Benchmarks", Hristea et al, 1997 ACM Digital Library.

* cited by examiner

SELECTIVE SNOOPING BY SNOOP MASTERS TO LOCATE UPDATED DATA

FIELD OF THE INVENTION

This invention relates generally to cache memory snooping and, more particularly, to an improved technique for snooping hardware enforced cache coherency when at least one master on a bus has a cache and shares data within an address range with other masters.

BACKGROUND OF THE INVENTION

In a system wherein there are multiple devices that share a common main memory, and each device can individually cache data from addresses in main memory, to ensure data consistency among devices, a mechanism often used is known as hardware enforced cache coherency of data. A portion of this mechanism is known as "snooping". When a processor, or other snooping master, makes a coherent access to main memory, that access is first broadcast to all the other snooping masters (the "non-originating snooping masters") as a "snoop request" by a central resource, called the "Bus Macro". The non-originating snooping masters react to the snoop request by returning a snoop result that indicates the state of that master's cache for the address provided with the snoop request. The bus macro receives all the snoop results and takes one of several possible actions based on the values of the snoop results. One action may be to allow the main memory access to complete. Another action may be to delay the main memory access until the non-originating snooping masters write modified data from their caches back to main memory. Other actions are also possible. Note that the most common type of snooping master with a cache is a processor, although other devices, such as DMA controllers, can be used.

Typically, when memory coherence is required, all snooping masters continuously snoop all main memory accesses to ensure data consistency. However, there are often times when the originating master knows which non-originating snooping masters need to participate in the snooping of its request. In these cases, it is desirable not to broadcast the snoop request to the non-originating snooping masters that do not need to participate in the snoop. This is desirable for several reasons:

1) Unnecessary power is consumed making the snoop requests to non-originating snooping masters that do not need to receive the request.

2) Once the request is made to the non-originating snooping master, that snooping master must snoop its cache to see if it has a cached copy of the requested address location. This snooping of the cache may interfere with the non-originating snooping master from accessing the cache locally, thus decreasing the performance of the non-originating snooping master.

3) If one of the non-originating snooping masters takes many clock cycles to snoop its cache (e.g. because it is physically located across a bridge), the originating master will be stalled until the slowest non-originating snooping master has completed the snoop, thus decreasing the originating master's performance.

SUMMARY OF THE INVENTION

According to the present invention, a method of and structure for snooping the cache memories of a plurality of snooping masters connected to a bus macro having snooping logic is provided. Each of the snooping masters has a cache memory and the cache memories of some, but less than all, of the snooping masters may have the data requested by an originating snooping master and, in the disclosed protocol, the needed data in only one non-originating snooping master is marked as updated. A main memory having addresses for all data is connected to the bus macro.

An originating snooping master through the bus macro queries only those non-originating snooping masters which may have the requested data. All the non-originating snooping masters that have been queried reply through the bus macro to the originating snooping master. If a non-originating snooping master has the requested data marked as updated, that non-originating snooping master returns the updated data to the originating snooping master and possibly to the main memory through said bus macro. If none of the non-originating snooping masters have the requested data marked as updated, then the requested data is read from main memory by the bus macro, and then sent to the originating master.

DESCRIPTION OF THE PREFERRED EMBODIMENT(S)

Figure 1:
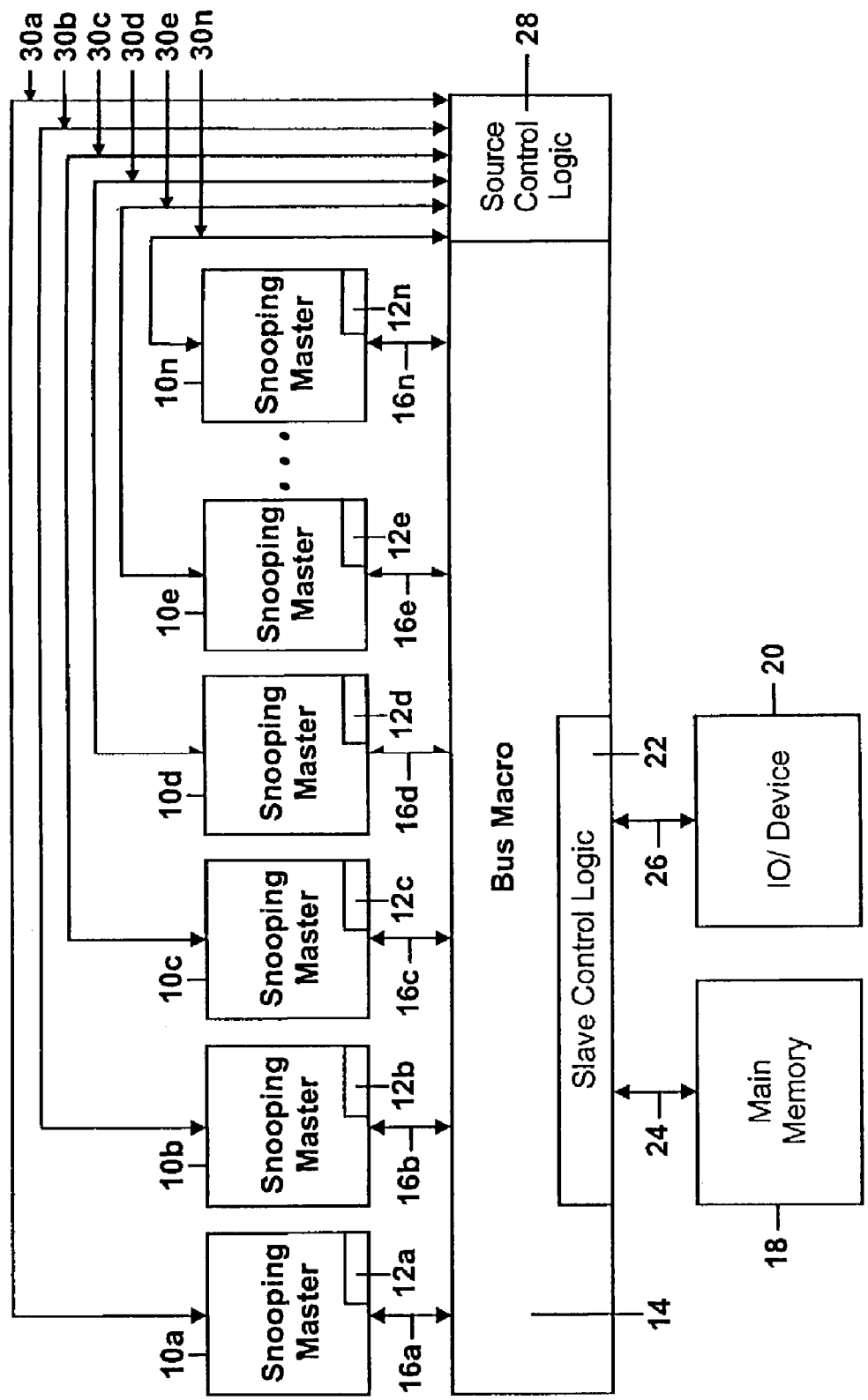
FIG. 1 is a high level diagram of a plurality of snooping masters and slave devices connected to a bus macro.

Referring now to the drawings, and for the present to FIG. 1, a high level block diagram of several snooping masters and several slave devices connected to a bus macro are shown. As illustrated in FIG. 1, a plurality of snooping masters or bus masters $10a$, $10b$, $10c$, $10d$, $10e$ . . . $10n$ are shown. As indicated above, the snooping masters $10a$ . . . $10n$ normally include processors, but they also may include certain other types of bus masters. It is required that the snooping masters that are to be snooped have cache memories $12a$ . . . $12n$ and be connected to bus macro 14 through connections $16a$ . . . $16n$. (The bus macro 14 will sometimes be referred to simply as bus 14). Although not shown, some masters may share a connection. Also shown are two slave devices in the form of main memory 18 and an I/O device 20. It is to be understood that more slave devices could be present. The main memory 18 and I/O device 20 are connected to slave control logic 22 on bus 14 through connections 24 and 26, respectively. The main memory 18 contains all the address locations that any master $10a$ . . . $10n$ may need. The snooping masters $10a$ . . . $10n$ are connected to snoop control logic 28 on bus 14 through connections $30a$ . . . $30n$, respectively.

Figure 2:
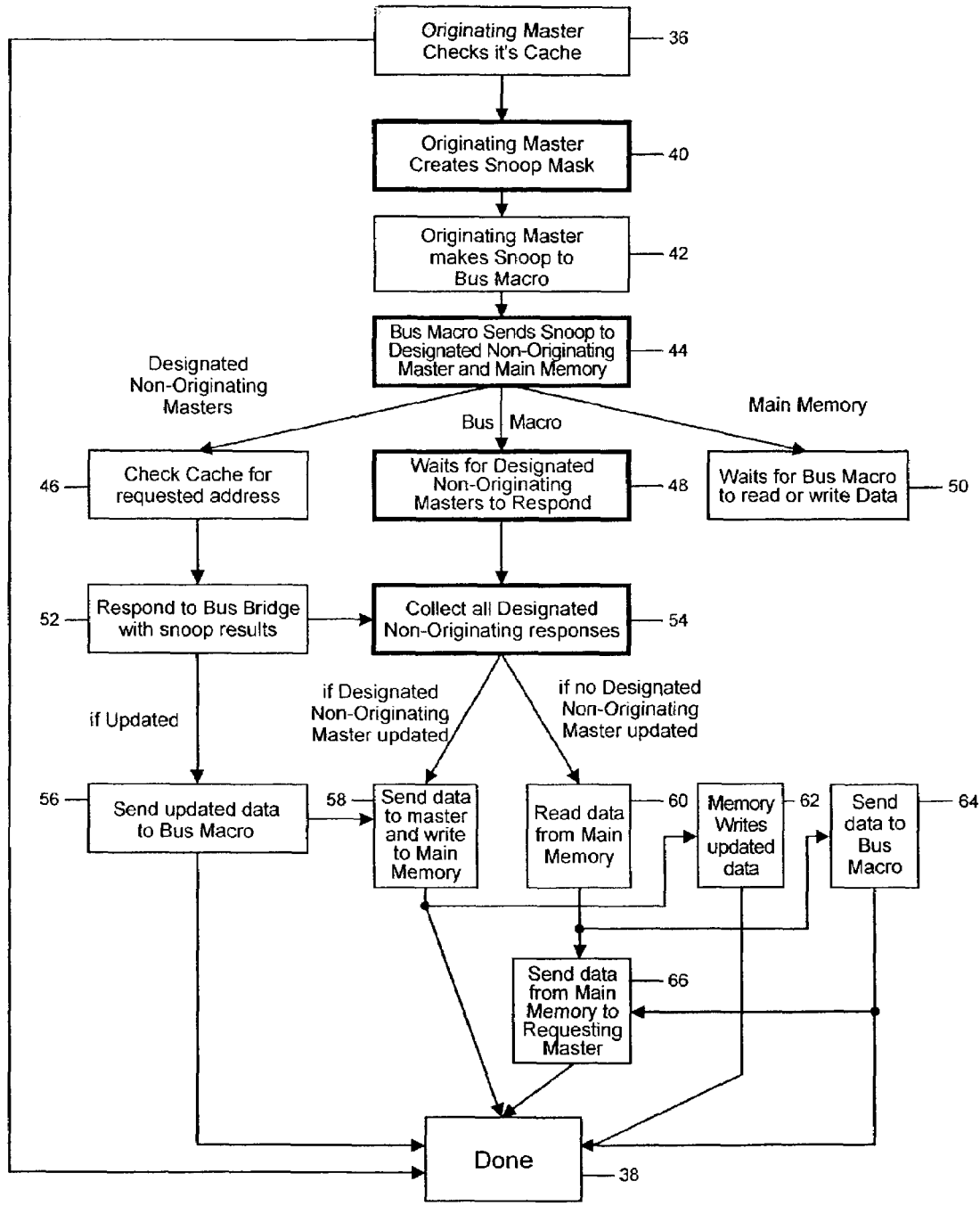
FIG. 2 is a flow diagram of the fulfillment of a snoop request that may be used in the invention.

Referring now to FIG. 2, the operation of the present invention where a snooping master requires updated data is shown as a flow diagram. (In FIG. 2, those steps that are unique to this invention have the boxes in heavier outline, and those steps that are common to the prior art are in normal outline in the boxes.) The term "snooping", as used herein, means a bus master which can query the cache memories of the non-originating bus masters for the data that the originating bus master needs and, if any of the non-originating bus masters $10a$ . . . $10n$ has such data which is updated, then the updated data is returned either directly or through main memory 18 to the originating bus master. There are many protocols that can use snooping, including but not limited to Modified Exclusive Shared Invalid (MESI), Modified Exclusive Invalid (MEI), Modified Exclusive Recent Shared Invalid (MERSI), and Modified Owned Shared Invalid (MOSI). The present invention will be described as it is implemented in MESI; however, it is to be understood that this invention is applicable to other protocols as well.

According to MESI, the protocol used in this scheme, only one master may have the data marked as updated (designated by the Modified state). If no updated data is found in any of the non-originating snooping masters' cache memories, the requested data is read from main memory 18 and written to the originating master.

As can be seen in FIG. 2, the first step 36 is for the originating master 10a to check its own cache memory 12a to see if data is there and marked with the desired state. The desired state for a write operation is Modified or Exclusive. The desired state for a read operation is Modified, Exclusive, or Shared. (In this illustration, master 10a is assumed to be the originating master, and the masters 10b ... 10n are assumed to be the non-originating snooping masters; however, any master 10a ... 10n can be the originating master, and all the other masters 10 are then the non-originating snooping masters.) If at step 36 the originating master 10a finds the desired data in its own cache memory 12a in the desired state, then no snoop query is generated, the data found in cache memory 12a is used by master 10a and the process is done as shown in step 38. If, however, cache memory 12a does not have the data in the desired state, then a snoop request is generated. According to the present invention, only those masters 10b ... 10n that might have the requested data are snooped. This is referred to as targeted snooping. This has three beneficial effects over the prior art technique of snooping all non-originating snooping masters 10b ... 10n, as follows:

1) power is saved by not querying any masters 10b ... 10n that cannot have the requested data;

2) those masters that cannot have the data are not delayed from performing the task in which they might be engaged when a query is received; and 3) extra clock cycles are not unnecessarily incurred while waiting for snoop responses from long latency masters that cannot have the requested data, which will hold up the response time to the originating master.

In order to accomplish this limited or targeted query, a snoop mask is generated by the requesting master as shown in step 40. Alternatively, this snoop mask could be generated by the bus macro and operate in the same manner. In another embodiment, the snoop mask could be generated by non-originating snooping masters, in which case the request would be sent to these non-originating snooping masters but their cache memory would not be queried and, thus, the request would be acted on in a non-invasive manner. Only the mask generation by the originating master will be described herein. Mask generation by the originating master is accomplished by the originating master 10a having knowledge of which non-originating snooping masters could potentially share the requested data. There are a variety of techniques by which the originating master could determine which non-originating snooping masters could potentially share the requested data. One such technique involves a program resident in each master 10a ... 10n which "knows" what tasks each master 10a ... 10n is performing and has performed. This could be as simple as "knowing" that certain masters 10a ... 10n would not have data in the requested data range, or it could be more complex. From this information, the originating master 10a can exclude a subset of masters 10b ... 10n which would not have the requested data. The snoop mask may be represented in a multitude of ways. One such mechanism is a simple one bit flag for each non-originating master 10b ... 10n, wherein a "1" indicates that that specific master 10 be queried, and a "0" indicates this specific master 10 not be queried. The originating master 10a then conveys the snoop request to the bus 14, including the snoop mask created as shown in step 42. The bus 14 under the control of snooping logic 28 sends the snooping query to all designated (by the snoop mask) non-originating snooping masters 10 as shown in step 44. From this point on, the operation of the snooping is similar to the prior art as dictated by the particular protocol.

Each of the designated (by the snoop mask) non-originating masters 10 checks its cache memory 12 for the requested address of the data as shown in step 46, while the bus 14 waits for the designated non-originating masters 10 to respond as shown in step 48, and the main memory 18 waits for the bus 14 to read or write data as shown in step 50.

Each designated, non-originating master 10 responds to the bus 14 with its snoop results as to whether it has or does not have updated data as shown in step 52, and the bus 14 collects these results as shown in step 54. If one of the designated, non-originating masters 10 has updated data (it will be remembered that only one master 10a ... 10n can have updated data so marked in this protocol), the updated data is sent to the bus 14 as shown in step 56. If updated data is sent to the bus 14, this updated data is sent by the bus 14 to the originating master 10a and to main memory 18 as shown in step 58, the data in cache 12a of the originating master 10a conditionally being marked as updated and the main memory being written as shown in step 62. (It is to be understood that in some protocols the updated data may be sent only to the originating master 10a or only to the main memory 18, or it may be sent indirectly to the originating master 10a through the main memory 18 and read therefrom.) If none of the responses from the designated non-originating masters 10 indicate that cache memories 12 contain data marked as updated in step 54, then data is read from the proper address in main memory 18 as shown in step 60 and sent to the bus 14 as shown in step 64, which sends the data from the main memory 18 to the originating master as shown in step 66 in this protocol. At this point, the snooping is completed.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A method of snooping the cache memories of a plurality of snooping masters connected to a bus having logic, comprising at least two of said snooping masters having a cache memory, and wherein the cache memories of some, but less than all of said cache memories, have the data needed by an originating snooping master and with said needed data marked as updated, and wherein main memory has addresses for all data which is connected to said bus, including the steps of:

querying only the cache memory of those snooping masters which have the requested data through said data bus; and collecting all designated non-originating responses at all of said non-originating snooping masters that have been queried replying through said bus to said originating snooping master and creating a non-speculative snooping mask and, if a non-originating snooping master has the requested data marked as updated, said non-originating snooping master returning said updated data directly or indirectly to the originating snooping master or to the main memory, or both through said bus, and thereafter end snooping without checking the validity of the snoop mask and data.

2. The invention as defined in claim 1 wherein a snoop mask is created to control the query.

3. The invention as defined in claim 2 wherein the snoop mask allows delivery of the snoop request only to a non-originating snoop in masters that potentially have updated data.

4. The invention as defined in claim 3 wherein each snooping master is provided with information regarding the status and tasks being performed by all the other snooping masters, and wherein an originating snooping master generates a designation of which non-originating snooping masters are to be queried for said information.

5. The invention as defined in claim 4 wherein the originating snooping master generates a snooping mask which it conveys to the logic in the bus bridge.

6. The invention as defined in claim 1 wherein said logic on the bus includes logic for writing to said originating snooping master requested data from main memory if no updated data is found in any of the non-originating queried snooping masters.

7. The invention as defined in claim 1 wherein only one snooping master has cache memory that can be marked as updated.

8. The invention as defined in claim 1 wherein the updated data is returned directly to the originating snooping master.

* * * * *